(12) United States Patent
Lin

(10) Patent No.: US 7,239,510 B1
(45) Date of Patent: Jul. 3, 2007

(54) ENCLOSURE FOR COMPUTING DEVICE

(75) Inventor: Teng-Feng Lin, San Chung (TW)

(73) Assignee: East Best Co., Ltd., Taipei Hsien (TW)

( * ) Notice: Subject to any disclaimer, the term of this patent is extended or adjusted under 35 U.S.C. 154(b) by 46 days.

(21) Appl. No.: 11/298,676

(22) Filed: Dec. 12, 2005

(51) Int. Cl.
*G06F 1/16* (2006.01)

(52) U.S. Cl. .................. 361/683; 439/567; 206/320; 312/223.2

(58) Field of Classification Search .......... 439/701, 439/567, 65, 76.1; 206/320, 586; 312/223.2–223.6; 361/679–687, 724–727
See application file for complete search history.

(56) References Cited

U.S. PATENT DOCUMENTS 5,299,685 A * 4/1994 Chin .......................... 206/320
6,317,314 B1 * 11/2001 Kung et al. ................ 361/680
6,692,310 B2 * 2/2004 Zaderej et al. ............. 439/701
2004/0207297 A1 * 10/2004 Chen et al. ............... 312/223.2

* cited by examiner

*Primary Examiner*—Hung Van Duong
(74) *Attorney, Agent, or Firm*—Leong C. Lei

(57) ABSTRACT

An enclosure for housing various components of a computing device is provided herein, which contains at least three L-shaped corner members, at least three elongated wall members, a top cover member, and a bottom cover member. The corner members and the wall members are interleaved and joined to form a polygonal circumference for the enclosure. The top and bottom cover members are fixed to the top and bottom of the circumference respectively into a closed, polygonal-shaped enclosure so that a component of the computing device such as the motherboard, optical disk drive, hard disk drive, etc., could be housed therewithin.

7 Claims, 4 Drawing Sheets

ENCLOSURE FOR COMPUTING DEVICE

BACKGROUND OF THE INVENTION (a) Technical Field of the Invention

The present invention generally relates to enclosures, and more particularly to an enclosure for housing the components of a computing device.

(b) Description of the Prior Art

A conventional computing device such as the commonly seen desktop computer or the like usually has its components such as the motherboard, power supply, hard disk drive, etc., housed in a single enclosure, and the input/output devices such as the keyboard, display, etc., are externally connected to the computing device.

This single-enclosure approach has a number of shortcomings. No matter how the appearance of the enclosure is designed, the conventional enclosure is a hollow case providing enough internal space for accommodating the components of the computing device and some reserved space for future expansion. In addition, as the enclosure is usually assembled by welding or riveting a number of metallic plates and cannot be dismantled and re-assembled easily, the manufacturer's storage and transportation effort and cost for the conventional enclosures are significant. Secondly, the fixed dimension and appearance of the conventional enclosures confine their flexibility to satisfy the different requirements from various users.

SUMMARY OF TH INVENTION

The primary purpose of the present invention is to provide a novel structure for housing various components of a computing device inside standardized, building-block-like enclosures.

An enclosure according to the present invention contains at least three L-shaped corner members, at least three elongated wall members, a top cover member, and a bottom cover member. The corner members and the wall members are interleaved and joined to form a polygonal circumference for the enclosure. The top and bottom cover members are fixed to the top and bottom of the circumference respectively so as to form a closed, polygonal-shaped enclosure so that a component of the computing device such as the motherboard, optical disk drive, hard disk drive, etc., could be housed therewithin.

The enclosure of the present invention is simple-structured that a layman could assemble and disassemble all by oneself easily and conveniently. As to the manufacturer, the enclosure could be dismantled for storage or during transportation so as to achieve significant savings for the relevant cost and effort.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
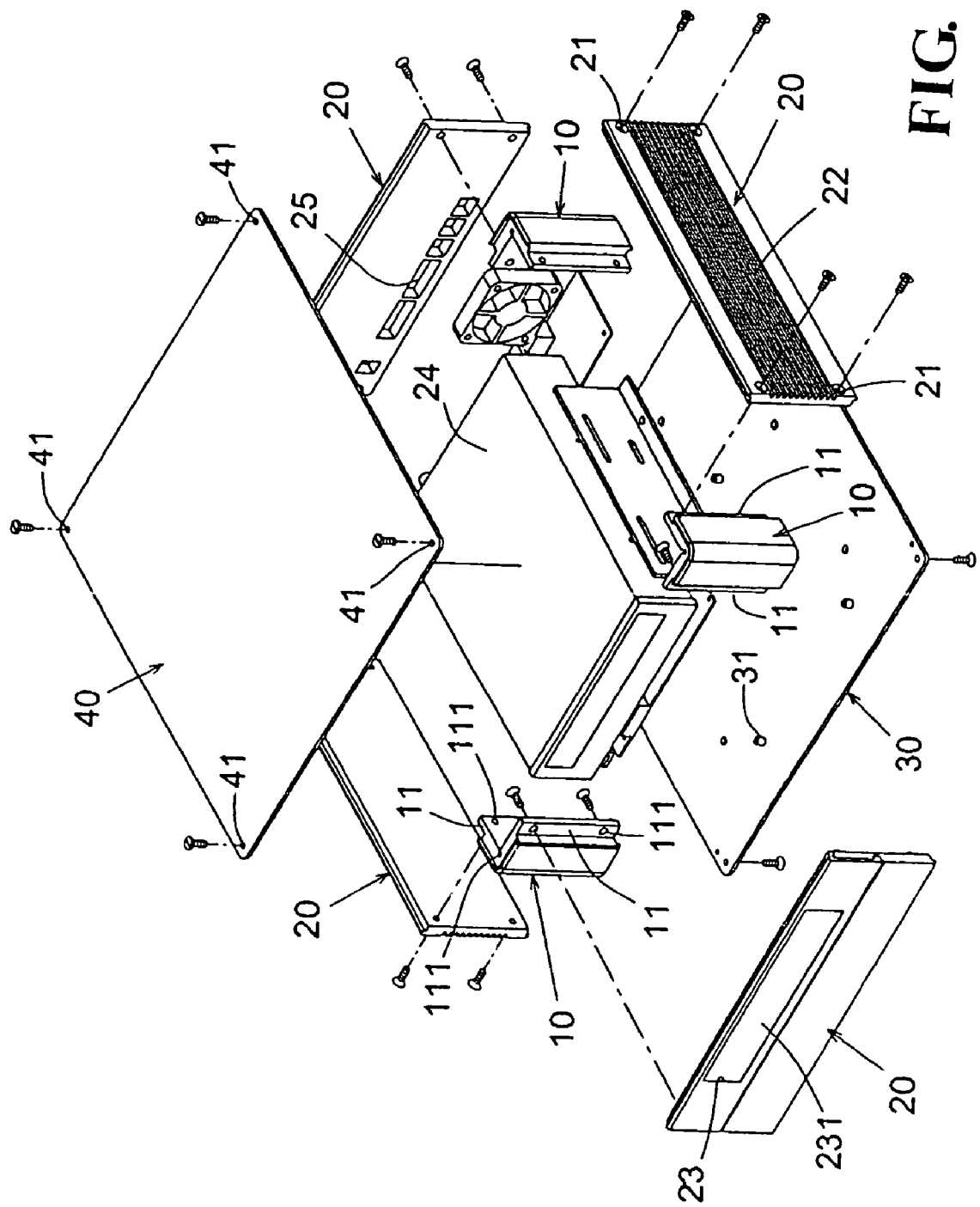
FIG. 1 is a perspective exploded view showing the enclosure according to an embodiment of the present invention.
Figure 2:
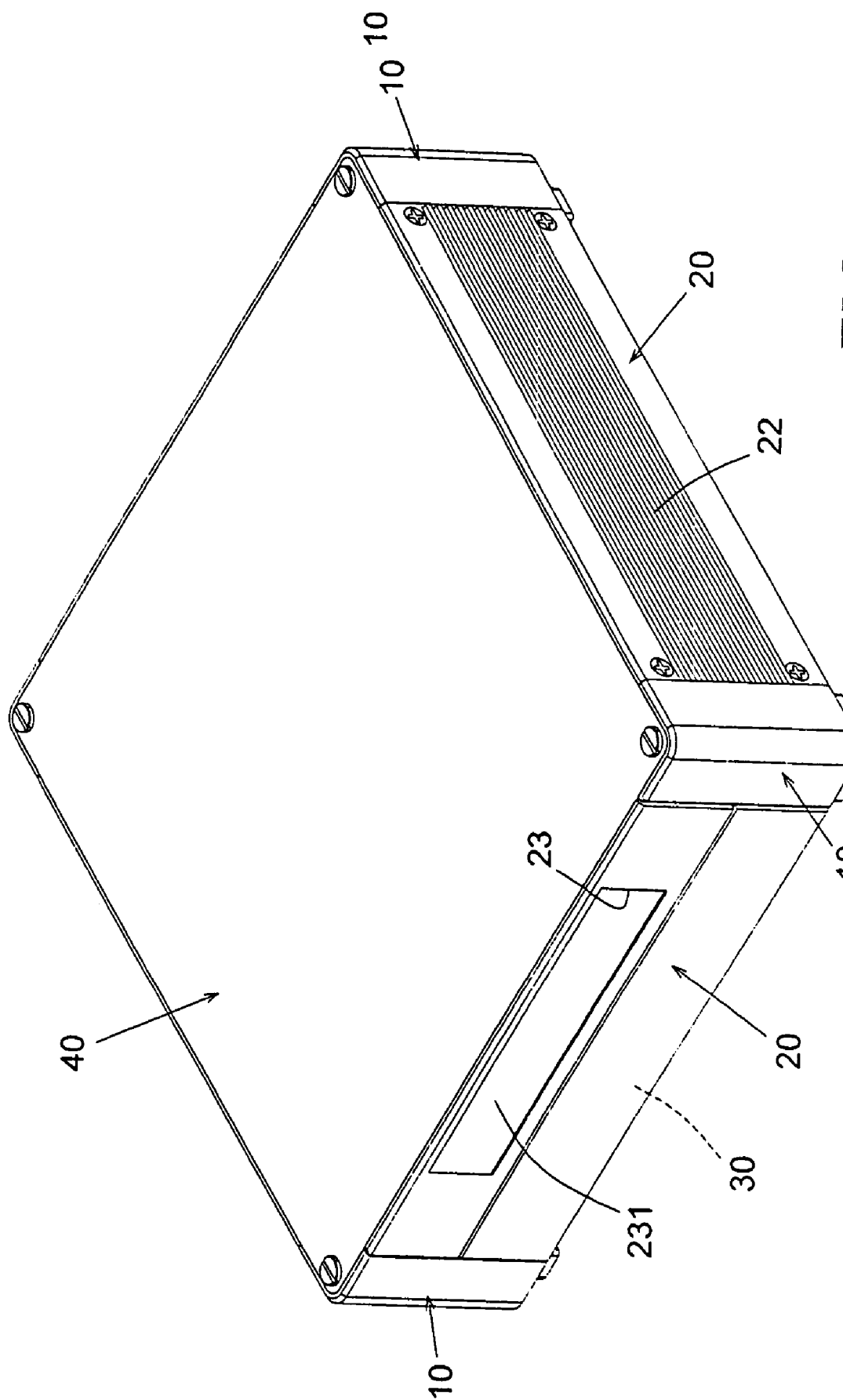
FIG. 2 is a perspective view showing the appearance of the enclosure of FIG. 1 after its assembly.
Figure 3:
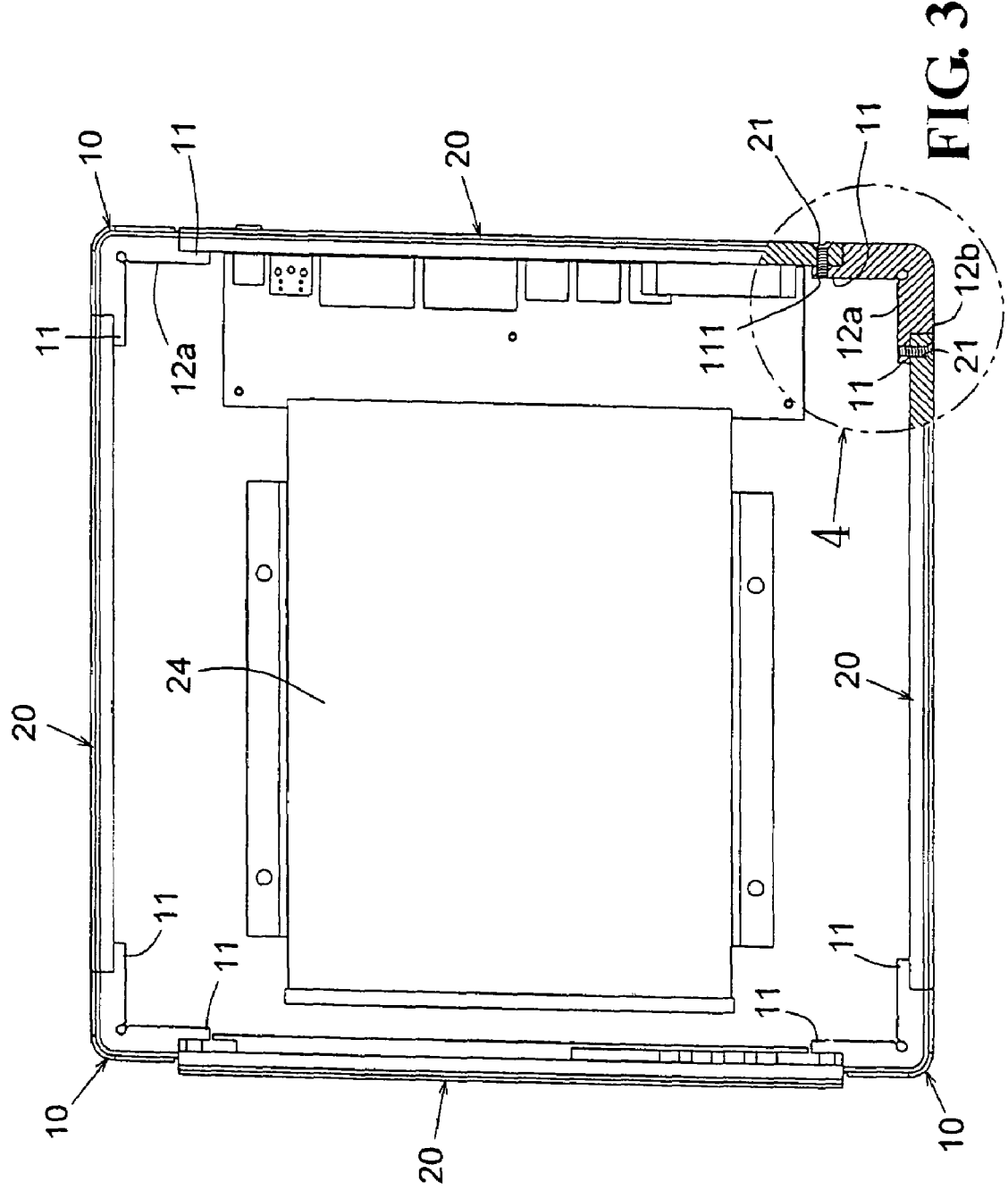
FIG. 3 is a schematic top view showing the internal details of the enclosure of FIG. 1.
Figure 4:
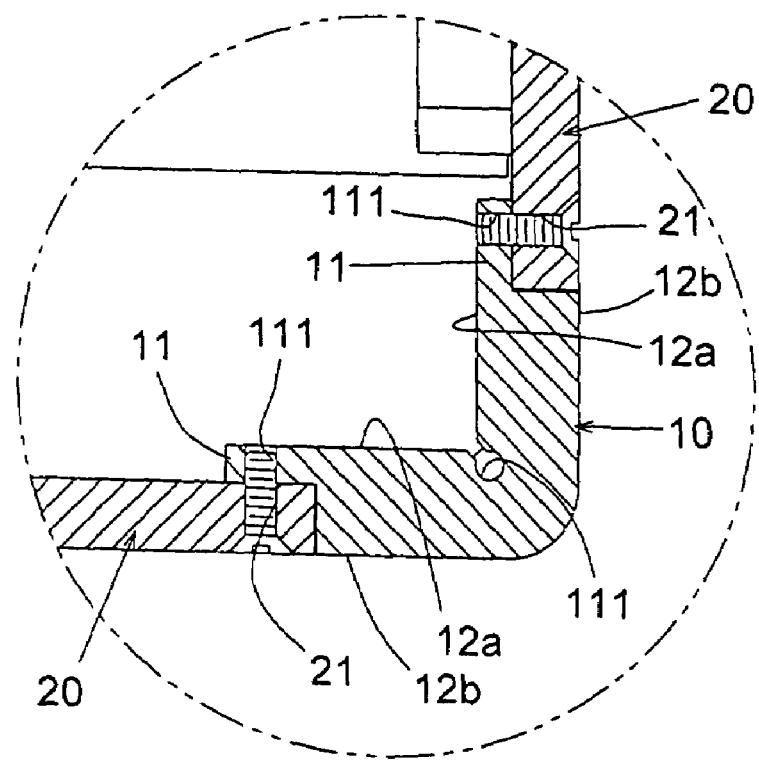
FIG. 4 is an enlarged view showing the details inside the circle 4 of the enclosure of FIG. 3.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1~4, the enclosure according to an embodiment of the present invention mainly contains four L-shaped corner members 10. The two wings of each L-shaped corner member 10 are recessed inward for an appropriate distance at the ends to form thinner walls 11. A number of bolt holes 111 are formed at appropriate locations on each wall 11, and on the top and bottom surfaces of each corner member 10. The enclosure further contains four elongated wall members 20. The four corner members 10 and the four wall members 20 are interleaved and joined together to form a rectangular circumference of the enclosure, which has an inner surface 12a and an outer surface 12b The thickness of the wall members 20 is such that, when the two ends of the wall members 20 are matched with the recessed walls 11 of its adjacent two corner members 10, they flush with each other so that the outer surface 12b of the circumference of the enclosure is smooth. At appropriate locations on the two ends of each wall member 20, there are bolt holes 21 configured to match the bolt holes 111 of the corner members 10. As such bolts (not numbered) could be screwed from the inner surface 12a into the matched bolt holes 111 and 21 to fixedly lock the corner members 10 and the wall members 20 together.

The enclosure further contains a top cover member 40 and a bottom cover member 30, whose shapes and dimensions match the rectangular circumference formed by the corner members 10 and the wall members 20. The top cover member 40 has a number of bolt holes 41 configured at locations corresponding to the bolt holes 111 on the top surfaces of the corner members 10 so that the top cover member 30 and the circumference are fixedly joined together by bolts (not numbered) through the matched bolt holes 111 and 41. Similarly, the bottom cover member 30 has a number of bolt holes 31 configured at locations corresponding to the bolt holes 111 on the bottom surfaces of the corner members 10 so that the bottom cover 30 and the circumference are fixedly joined together by bolts (not numbered) through the matched bolt holes 111 and 31. As such, a closed enclosure is formed for housing an optical disk drive, a hard disk drive, a motherboard, or any other component of a computing device. The bottom member 30 has an additional number of bolt holes 31 for fixedly positioning the housed component on the bottom member 30 with bolts (not numbered) through the additional bolt holes 31.

The corner members 10 could be formed as a single object by aluminum extrusion or other similar machinery means. The present invention does not impose any limitation on the fabrication means of the parts of the enclosure.

Additionally, optional heat sinking fins 22 could be formed by configuring a number of grooves on the outer surface of at least a wall member 20. As such, by increasing the surface area of the wall members 20, the heat dissipation efficiency of the enclosure is enhanced profoundly.

Further more, at least one of the wall members 20 could have a through opening 23 with a hinged dust-proof door 231, allowing, for example, the disk tray of an optical disk drive 24 housed inside the enclosure to slide through the opening 23.

At least another wall member 20 could have a number of through openings 25 configured at locations corresponding to the various connectors of the component housed inside, so as to expose these connectors for external connectivity. The four wall members 20 could also be configured into having different styles or colors to fit the particular look-and-feel required by the user.

Figure 5:
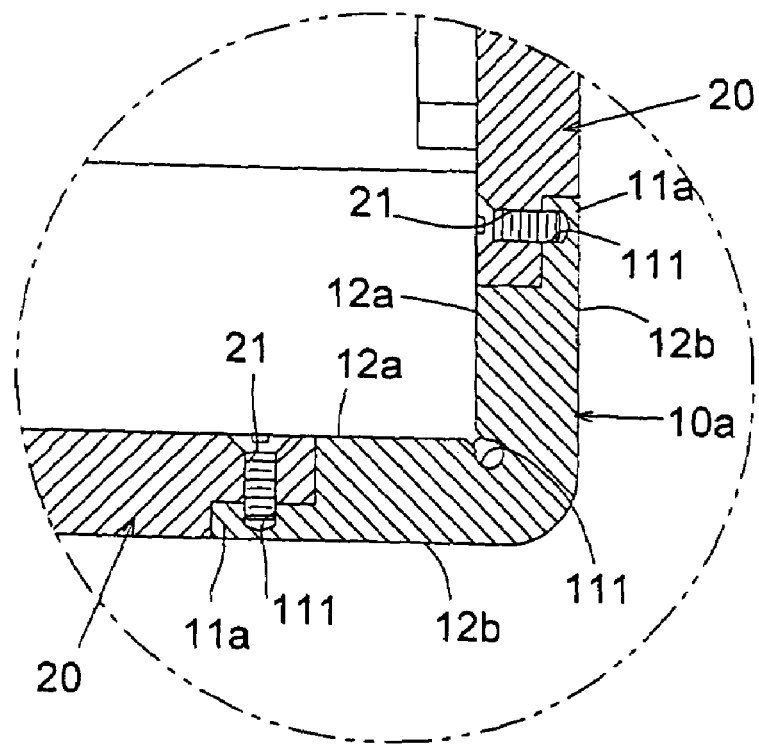
FIG. 5 is an enlarged view showing another embodiment of the details inside the circle 4 of the enclosure of FIG. 3.

FIG. 5 shows another embodiment of the joining of the corner members and the wall members. In this embodiment, the two wings of each L-shaped corner member 10a are recessed outward for an appropriate distance at the ends to form thinner walls 11a. In other words, the thinner walls 11a are extended along the outer surface 12b, instead of along the inner surface 12a as in the previous embodiment. Correspondingly, the two ends of the wall members 20 are recessed inward to have thinner walls (not numbered) extended along the inner surface 12a. As such, the thinner walls of the wall members 20 and the thinner walls 11a are matched perfectly so that both the inner surface 12a and the outer surface 12b of the circumference are smooth.

Please note that the present invention is not limited to a rectangular enclosure as shown in FIGS. 1~4. By altering the included angle between the two wings of the L-shaped corner members and the shapes of the top and bottom cover members, the present invention could be extended to form a triangular enclosure with three corner members and three wall member, or a pentagonal enclosure with five corner members and five wall members. The spirit of the present invention could be extended and applied to various shapes formable using at least three corner members.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An enclosure for housing a component of a computing device, comprising:
    at least three corner members, each of which has a 'L' shape whose two wings have recessed and thinner walls, and a plurality of bolt holes configured at appropriate locations on said thinner walls and on the top and bottom surfaces of said corner member;
    at least three wall members, each of which has an elongated shape, said corner members and said wall members being interleaved and joined to form a polygonal circumference, the two ends of each wall member being configured to match said recessed walls of said corner members so as to form a smooth outer surface of said circumference, the two ends of each wall member being configured to have a plurality of bolt holes at locations corresponding to said bolt holes of said corner members, each of said wall members fixedly joined to two corner members by bolts through said matched bolt holes;
    a top cover member positioned on the top of said circumference having a shape and dimension matching those of said circumference, said top cover member having a plurality of bolt holes configured at locations corresponding to said bolt holes on the top surface of said corner members whereby said top cover member is fixedly joined to said circumference by bolts through said matched bolt holes; and
    a bottom cover member positioned on the bottom of said circumference having a shape and dimension matching those of said circumference, said bottom cover member having a plurality of bolt holes configured at locations corresponding to said bolt holes on the bottom surface of said corner members whereby said bottom cover member is fixedly joined to said circumference by bolts through said matched bolt holes, said bottom cover member having another plurality of bolt holes for fixing said component of said computing device on said bottom cover member.

2. The enclosure according to claim 1, wherein said corner members are made by aluminum extrusion.

3. The enclosure according to claim 1, wherein said recessed and thinner walls are extended from each wall member along the outer surface of said circumference.

4. The enclosure according to claim 1, wherein said recessed and thinner walls are extended from each wall member along the inner surface of said circumference.

5. The enclosure according to claim 1, wherein at least one of said wall members has a plurality of heat sinking fins along the outer surface of said wall member.

6. The enclosure according to claim 1, wherein at least one of said wall members has a through opening with a hinged dust-proof door allowing external access to said component of said computing device housed inside said enclosure.

7. The enclosure according to claim 1, wherein at least one of said wall members has a plurality of bolt bolts providing external connectivity to the connectors of said component of said computing device.

* * * * *